July 21, 1959 A. W. POMPER ET AL 2,895,552
TRANSVERSE WEB CUTTING APPARATUS HAVING SHEET DELIVERY
MECHANISM USING TIMED VACUUM BELTS
Filed Aug. 10, 1955 2 Sheets-Sheet 1

INVENTORS
ANTHONY W. POMPER
CHARLES J. WAECHTER
BY

Leech and Radue

ATTORNEYS

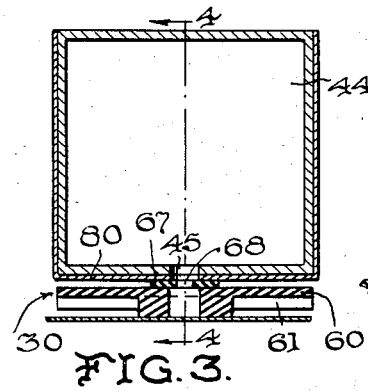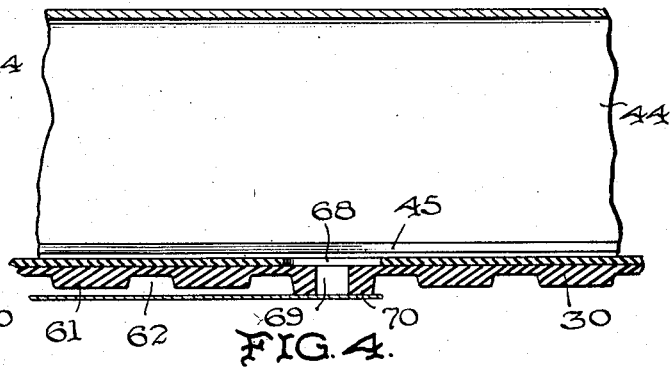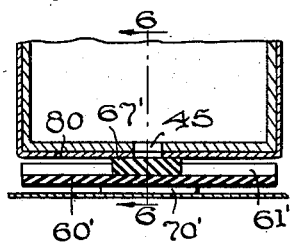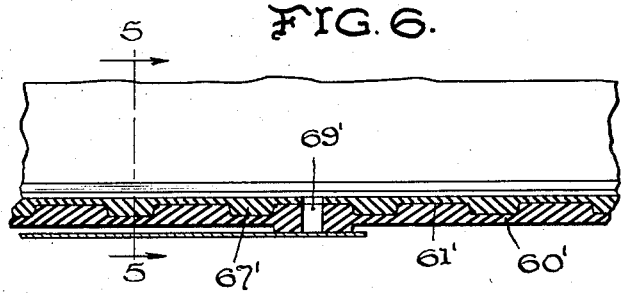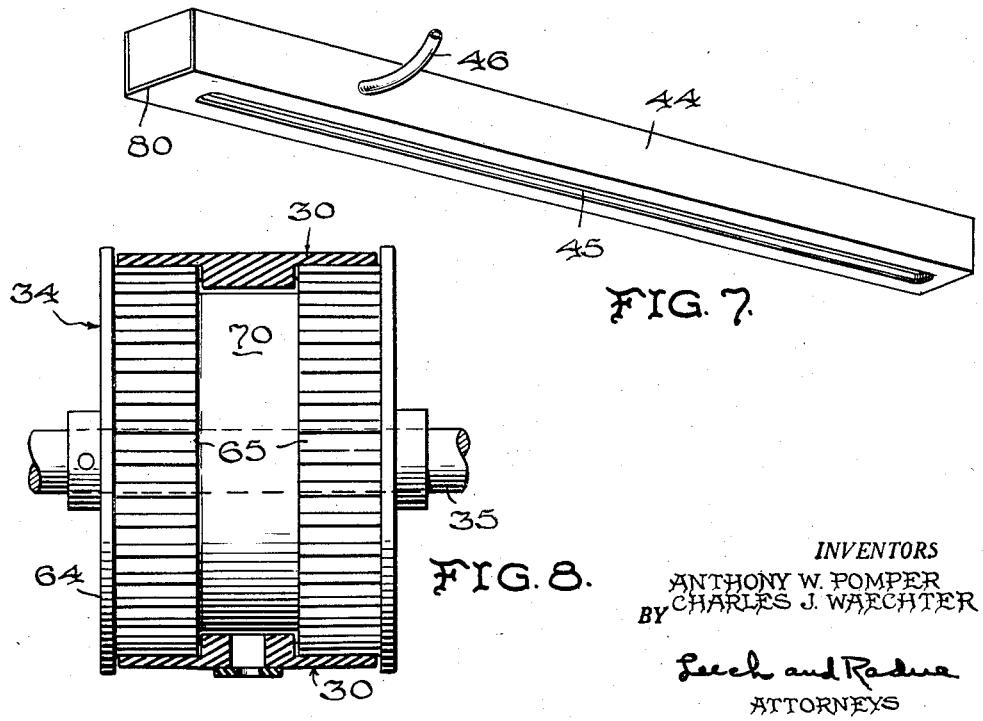

United States Patent Office 2,895,552
Patented July 21, 1959

2,895,552

TRANSVERSE WEB CUTTING APPARATUS HAVING SHEET DELIVERY MECHANISM USING TIMED VACUUM BELTS

Anthony W. Pomper, Piscataway Township, Middlesex County, and Charles J. Waechter, New Market, N.J., assignors to John Waldron Corporation, New Brunswick, N.J., a corporation of New Jersey Application August 10, 1955, Serial No. 527,462

12 Claims. (Cl. 164—68)

This invention relates to sheet delivery mechanism and more particularly to high speed sheet delivery mechanism adapted to handle sheets from a pile for delivery to converting apparatus or for piling sheets, converted while in web form and cut at the entrance to the delivery mechanism.

It is a general object of the present invention to provide novel and improved sheet delivery means.

An important object of the invention resides in the provision of sheet pickup, traverse and release mechanism functioning wholly pneumatically and driven, if desired, in timed relation to cutting or other operations.

Another important object of the invention resides in the use of a flexible belt perforated at intervals, having a reach extending at least between pickup and delivery points and means dependent on movement of the belt to apply vacuum to a perforation as it reaches pickup position and cut-off vacuum as the same perforation reaches a discharge point.

A further object of the invention resides in the use of a sprocket driven, resilient toothed belt, perforated at intervals of the order of sheet length and cooperating with a vacuum box to provide for sheet pickup, delivery and release in timed relation to an operation performed on the sheet before or during pickup.

A still further object of the invention consists in the use in sheet delivery means of a flexible, toothed, sheet-carrying belt adapted to be driven in timed relation to sheet treating processes whereby coordination of operations is effected.

One of the features of the sheet delivery mechanism comprises its association with a web printing press equipped with a sheet cutter and stacker, the delivery belts being arranged to pick up the leading edge of the web to assist in maintaining it taut during the cutting operation.

Another feature comprises the operation of the sheet delivery belts through coordination with vacuum boxes each having a slot covered by the belt and sized to apply and cut-off the vacuum to openings in the belt at proper intervals for sheet pickup and release.

Other and further objects and features of the invention will be more apparent to those skilled in the art upon a consideration of the accompanying drawings and following specification wherein are disclosed exemplary embodiments of the invention with the understanding that modifications and combinations thereof, such as fall within the scope of the appended claims, may be made without departing from the spirit of the invention.

In said drawings:

Fig. 3 is a cross-section, on an enlarged scale, taken on line 3—3 of Fig. 1 and illustrating the construction and cooperation of a delivery belt of one form and its vacuum box;

Fig. 4 is a fragmentary section taken on line 4—4 of Fig. 3;

Fig. 5 is a view similar to Fig. 3 but showing the timing and delivery belt in operation with the teeth on the side facing the vacuum box and taken on line 5—5 of Fig. 6;

Fig. 6 is a longitudinal section on line 6—6 of Fig. 5;

Fig. 7 is a perspective view of a vacuum box for use with either one of the timing belts; and Fig. 8 is a side elevation of a timing and carrier belt sprocket showing the arrangement of the teeth thereof to provide clearance for the longitudinal rib on the belt which cooperates with either the vacuum box or the sheets to be delivered, depending on the type of belt used, a section of the type belt wherein the side opposite the teeth engages the sheet to be delivered being shown.

The delivery of sheets of paper or like material at very high speeds is fraught with many difficulties. If they are fed forward in their own plane by engaging wheels or rolls the leading edge, when advanced free beyond the last set of rolls, is subject to deflection by wind currents, either natural or artificial, some of which may result from operation of an attendant machine. If the sheet is fairly long it may soar or float in the air so when its rear edge is released it continues, because of its momentum, and is difficult to cause to settle down to a position for piling or treatment before the leading edge of the following sheet arrives and causes interference. The present invention provides improved apparatus for handling sheets, and while illustrated in connection with apparatus for piling sheets sheared from high speed traveling web it is useful for delivering sheets from a pile to printing or other converting apparatus, and only obvious changes in the illustrated apparatus would be required.

Figure 1:
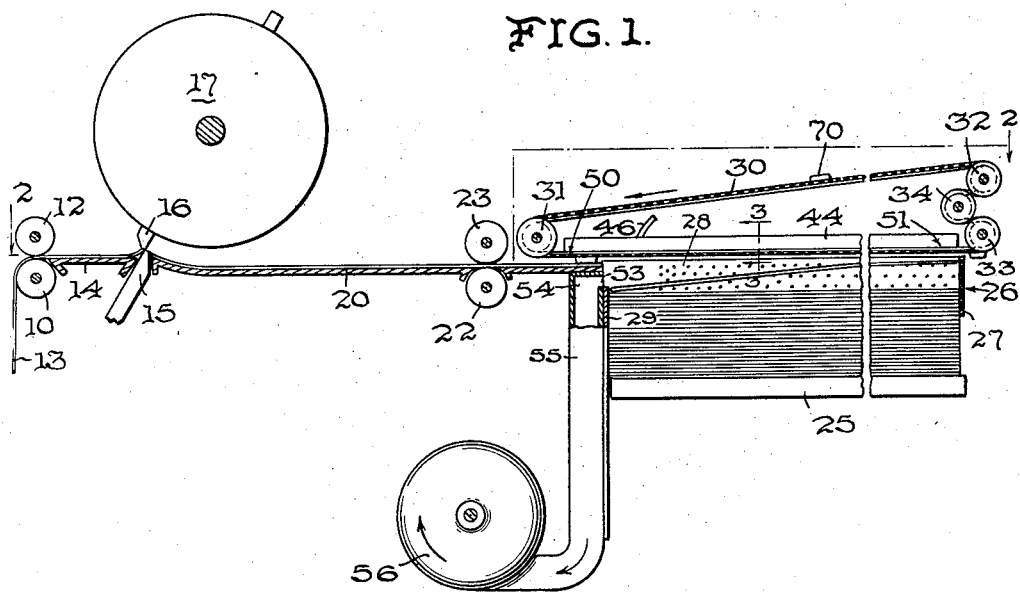
Fig. 1 is a side elevation, partially diagrammatic and schematic, of sheet cutting and delivery mechanism using timed vacuum belts, certain parts being longitudinally sectioned, or otherwise broken away to illustrate structural details.
Figure 2:
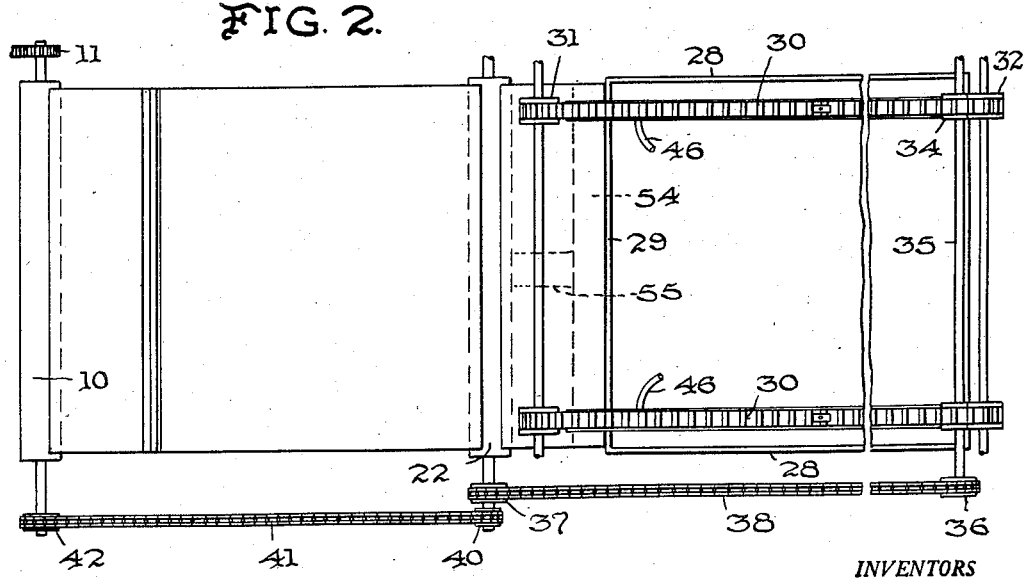
Fig. 2 is a top plan view and horizontal section thereof taken on line 2—2 of Fig. 1 and illustrating the timing and drive means.

The invention is shown largely diagrammatically, for simplicity of illustration. Referring first to Figs. 1 and 2, a pull roll 10, suitably driven through drive gear 11 from any apparatus with which it must be coordinated in speed, is assisted by idler wheels 12 in the high speed delivery of web 13 which may, for instance, have been printed or otherwise treated in suitable apparatus. The web is to be cut into sheets and passes over table 14, stationary knife or ledger plate 15 and table 20. It is periodically cut by the knife 16 rotated by counterbalanced knife wheel 17 synchronized with the speed of the pull roll and the printing or other treating mechanism, whereby the sheets are of desired length and the cut properly registered with the material on the web. The advancing web is supported beyond the shears on table 20 which guides the forward edge to the second pull roll 22 and idler wheels 23, the former being driven at a constant speed somewhat higher than that of the pull roll 10. These latter roll and wheels do not have as tight a nip as the first set and serve to maintain the web taut at the time of cutting since their lesser nip permits slippage while roll 10 and wheels 12 hold tightly, thus insuring uniform length of all sheets. The higher speeds of the second roll advances the trailing edge of the freshly cut sheet from the leading edge of the web following behind it so that the cut sheet may be disposed of prior to interference therewith by the leading edge of the web and/or next sheet when cut.

As illustrated the cut sheets are to be piled on a so-called drop board 25, the structure of which is so well known that it need not be described here other than to say that means are provided to continuously lower the board as sheets are piled on it to maintain the level of the top sheet substantially uniform, and in the present instance below the level of the top of table 20 by an inch or two.

Surrounding closely the upper portion of the pile and extending up substantially to the level of the top of table 20 is a collar or fence 26 comprising a remote or stop wall 27, two side walls 28 and a front wall 29. Except as later described the front wall is imperforate as are the adjacent portions of the side walls 28 as illustrated. The remainder of the side walls and the stop wall 27 is highly perforated to allow the escape of air from beneath sheets supplied to the pile and released at the level of the table 20.

In order that sheets when cut may be unhampered where projecting beyond pull roll 22, so that the momentum of the sheet is not required for its delivery, and to simultaneously hold the sheets down against lifting by air currents or soaring due to their velocity, each sheet is picked up at points near its leading edge and corners and dragged to a position where it is substantially over the pile when it is released, its forward edge stopped by perforated stop wall 27 and the sheet allowed to fall onto the pile. The dragging operation is effected by two or more identical, endless belts 30 illustrated in Fig. 2 as two in number spaced over the drop board near the edges of the sheets and extending beyond the back and front edges of the board. These belts 30 are of flexible material of limited elasticity, such as relatively rigid rubber reinforced with fabric, and since they are required to be timed in their movement in relationship to pull rolls 10 and 22 and the cutting mechanism, one face of the belt is equipped with spaced transverse teeth making it in effect a flexible rack capable of cooperating with a toothed drive wheel whereby it is given the desired travel rate. As seen in Fig. 1 each belt forms a continuous loop traveling over front idle pulley 31 positioned between the wall 29 and the pull roll 22 and over upper and lower idle pulleys 32 and 33 spaced outwardly beyond the remote wall 27 surrounding the pile. The active toothed drive sprocket or gear 34 is arranged to engage the toothed face, which in this case is the outer one, of the belt to drive it. The shaft 35 carrying this gear is fitted with a sprocket 36 of the same diameter as sprocket 37 on the shaft of pull roll 22 and these are connected by a chain 38 so that the linear velocity of the belts is the same as the peripheral velocity of delivery pull roll 22.

As previously mentioned, pull roll 22 is driven at an incremental higher speed than pull roll 12, achieved by the sprocket 40 on the shaft of pull roll 22 connected by chain 41 to sprocket 42 of larger diameter on the shaft of pull roll 10.

The lower reach of the belt extends horizontally between idler 31 and idler 33 and its lower face is spaced only slightly above the level of the top of the table 20 and the upper edges of the walls surrounding the top of the pile. The upper face of this lower reach engages the bottom wall of a stationary elongated vacuum box 44 which may be slightly curved from end to end to insure continuous contact by the belt. This lower wall is provided with a longitudinal slot 45 seen in Fig. 7 and the box is otherwise closed and connected, for instance, by tubing 46 with any suitable vacuum pump or the like. As viewed in Fig. 1 the slot 45 extends from approximately the position indicated by arrow 50 to that indicated by arrow 51 and the belt is provided with at least one through aperture which is connected through the slot to the vacuum while the apertured portion of the belt travels along the box. The synchronization is such, and effected by drive means already described, that the aperture is positioned near and moving in the same direction as the leading edge of the web at the time of shearing. At this position the aperture is in register with slot 45 causing the sheet to be gripped and carried forward at the same speed at which the rear portion is fed by the pull roll 22. After release by roll 22 the belts alone drag the sheet forward until their apertures are deenergized on reaching the position of the arrow 51 by running out of register with the slot 45. The delivery movement of the sheet is rapid since the apparatus is capable of cutting more than 8000 sheets an hour and there is no substantial bellying down of the intermediate portion of the sheet between its support by the two belts near its forward edge and that support offered by the table 20 after the pull roll 22 releases the trailing edge thereof. The forward velocity of the sheet is stopped after release by the belts by engagement of its front edge with stop wall 26 which is of sufficient height for the purpose.

In order that the rear edge of the sheet may be rapidly lowered onto the pile to prevent interference with the leading edge of the following sheet, the rear wall 29, against which the back edge of the pile substantially engages, is longitudinally slotted at 53 above the pile level and connected to a manifold 54 from which eduction piping 55 leads to suction fan 56 which runs continuously and provides a lowered air pressure, beneath the rear edge of each delivered sheet, where the perforations are absent in the back and side walls, quickly pulling down this edge and particularly the rear corners where the greatest difficulty has heretofore been experienced. The potentially interfering portion of the sheet is thus out of the way when the leading edge of the following sheet comes along in rapid succession. If the forward edge of the last sheet has not dropped it is pushed down under the positive action of the next sheet being drawn forward by the belts and thus an accurate pile is achieved without any disarrangement of any of the sheets.

Several styles of toothed belts are suitable for use with the apparatus described and Figs. 3 and 4 illustrate on an enlarged scale a portion of a belt and the vacuum box 44. The main portion of the belt 30 comprises a flat web 60 of substantial width having on its outer or non-vacuum box engaging face a plurality of large transverse teeth 61 separated by suitable uniform spaces 62. These teeth extend for the full transverse width of the belt and are adapted to engage with teeth on the shrouded gear or sprocket wheel 34 seen in Fig. 1 and in greater detail in Fig. 8. The teeth 65 are shaped and spaced to fit in the areas 62 between the belt teeth to insure a uniform timed drive of the belt.

In order to reduce the friction against the face of the suction box the back wall of the belt is either smooth and flat or has such a raised central area or rib 67 as shown in Figs. 3 and 4 to reduce the area of contact. This rib is only a little more than twice the width of the slot but adequate to maintain sealing beyond the slot walls. Each aperture through the belt may be elongated in the rib area 67, as seen at 68 in Figs. 3 and 4. The extension of this aperture is preferably circular or rectangular, as seen at 69 through the proper tooth, which is here illustrated as provided with an appropriate soft rubber pad 70 increasing its height so that it may engage the sheet while the remaining teeth are spaced some distance above it. In order to clear these pads the center portion of the drive sprocket 34 is circumferentially channeled as at 70 in Fig. 8.

In case it is preferred to run the belt with the teeth inwardly, which permits the elimination of one or both idler pulleys 32, 33, with the drive sprocket 34 then assuming the position of idler 33 the belt may be constructed as illustrated in Figs. 5 and 6. Here the teeth 61' are on the inner face of the web portion 60' and the built-up runner 67' extends over and between all of the teeth for its width to insure against any leakage of vacuum between the teeth. This belt runs with equal facility on the type of sprocket shown in Fig. 8. Here the plane back or outer face of the belt is provided with appropriately spaced pads 70' surrounding the apertures 69' through the belt.

Conveniently the belt is made of a length to accommodate three apertures and their pads. These require spacing between apertures, which determines the overall length of the belt loop, as compared with each sheet length by the ratio of speeds of pull rolls 22 and 10 and under these circumstances an aperture will be properly spaced adjacent the leading edge of each sheet as it approaches the forward edge of the table 20 as shown in Fig. 1 and the action of the secondary pull wheels will be augmented by the pull of the belts at the time of shearing.

The vacuum used to pick up and carry the sheets is relatively high and imposes a substantial friction load on the belts where they contact the faces of the vacuum boxes. It has been found that the heating resulting from this friction as well as the friction itself may be considerably reduced by coating or covering the lower face of the box with a thin layer of Teflon, and this is illustrated in Figs. 3, 5 and 7 at 80. Since this material is highly resistant to adhesion or cohesion, special adhesives are required for its application and to give them adequate surface area for holding, the sheet is preferably carried around over the two sides of the vacuum box as illustrated. This also removes most of the adhesive from the effects of the heat generated on the contacting face.

The apparatus just described has proven in use to be extremely effective for handling paper in all ranges from tissue to light weight board and operates without any difficulty whatsoever in the stacking operation.

We claim:

1. Apparatus for cutting a high speed travelling web into sheets, delivering and stacking the same comprising, in combination, means for continuously feeding said web at a uniform speed, a shear driven to cut said web into uniform length sheets, a drop board for receiving said sheets, a belt having a reach extending at least from a position above the leading edge of the web at shearing to the forward edge of the drop board, a vacuum box contacting the upper face of said reach and having a longitudinal slot in the belt contacting face, means driving said belt in timed relation to but faster than said web, and an aperture through said belt adapted to register with said slot as the aperture approaches the leading edge of the sheet just prior to shearing to apply a tension to the web during shearing and to remove the cut sheet, said slot terminating at a position to cut-off vacuum from said aperture as the leading edge of the sheet is at the forward edge of the drop board.

2. The apparatus of claim 1 in which said belt has a plurality of said apertures spaced apart a distance bearing the same ratio to sheet length as belt speed is to web speed.

3. The apparatus of claim 1 in which the belt is provided with teeth and the drive means therefor comprises a toothed pulley.

4. A belt for conveying suction from a slot in a suction box to a sheet of material for supporting the same for transportation beneath the lower reach of said belt when mounted on supporting pulleys comprising, a continuous web of impervious flexible material having limited resilience, integral teeth extending from one face of said web transversely to the length thereof for cooperation with a driving gear, one face of said web having a continuous longitudinally disposed transversely flat, central area for sealing with the slotted under face of the suction box, and at least two apertures through the belt in said central area, adjacent apertures being longitudinally spaced apart less than the length of said slot and slightly more than the length of a sheet whereby only one aperture holds a sheet.

5. The belt of claim 4 in which the said continuous flat central area is arranged on the toothed face of the belt and projects above the tops of the teeth to reduce the friction on the slotted face of the suction box.

6. The belt of claim 4 in which the said continuous flat central area is on the face of the belt opposite said teeth and said aperture extends from said face through onto the face of a tooth.

7. The belt of claim 6 in which the face of the apertured tooth is built out in its central area only, beyond the faces of the unperforated teeth to present a pad for sheet pickup.

8. Apparatus for severing a traveling web into sheets, delivering and stacking them on a drop board at least one sheet length removed from the severing position, in combination, means for continuously feeding said web at a uniform speed, a shear, synchronized with said means to cut the web into uniform sheets, a continuous belt having a lower reach extending at least from a position above the leading edge of the web at shearing to the remote edge of the drop board, a vacuum box having a lower longitudinally slotted face in engagement with the upper face of said reach, means driving said belt at a fixed increment faster than said web, an aperture through said belt timed to register with said slot as the aperture approaches the leading edge of the web while traveling in the same direction just prior to shearing, said slot extending continuously to a position just above, the remote edge of the drop board.

9. The apparatus as defined in claim 8 in which means actuates the drop board so that the pile thereon always has its upper surface substantially below the end of a sheet being delivered by said belt, an enclosure surrounding the upper portion of said pile and having four walls extending from below said surface to nearly the sheet delivery level, the wall over which the sheets approach the pile and the adjacent ends of the side walls being solid and the remaining wall and other side wall parts being perforated, a horizontal slot in said near wall and a suction device connected to said slot to remove air from beneath the trailing edge of each sheet to settle it rapidly.

10. The apparatus of claim 8 in which said feed means is positioned ahead of the shear, a second feed means following the shear, means to drive the second feed means at the same feed speed as said belt, and means providing the first feed means with more nip than the second to resist the pull of the second feed means and the belt whereby the web is held taut for cutting.

11. The combination of a vacuum box having a long substantially flat, substantially horizontal wall provided with a continuous slot longitudinally disposed therein, a suction conveyor belt for delivering articles and having an aperture therethrough at each article length increment thereof, means to drive said belt with a portion of its upper face in engagement with said wall so that the aperture may periodically register with said slot to energize the aperture for a predetermined distance of travel equal to the slot length and at least equal to the article length, said belt having a surface of rubberlike material and said vacuum box wall being covered with Teflon to reduce the friction drag.

12. The combination with a gear toothed driving wheel, an idler pulley and a vacuum box having a long substantially flat and horizontal wall provided with a continuous longitudinal slot, of a suction conveyor belt for delivering articles suspended therefrom and having apertures therethrough spaced slightly greater than article length from each other, means to drive said gear and thus the belt with a portion of its upper face in engagement with said wall so that the apertures periodically, successively and singly register with said slot for energization for a distance of travel equal to the slot length and at least equal to the article length, one face of said belt being fitted with teeth to mesh with those on the wheel, both faces of said belt having means extending beyond the surface thereof, one to engage the article to be suction carried by the belt through said aperture, and the other being narrow to run on the under face of the vacuum box, and said wheel having a circumferential groove therein to accommodate one of said last mentioned means.

References Cited in the file of this patent
UNITED STATES PATENTS

| | | |
|---|---|---|
| 664,340 | Sturtevant | Dec. 18, 1900 |
| 702,494 | Sherwood | June 17, 1902 |
| 949,935 | Maxon | Feb. 22, 1910 |
| 1,610,818 | Spadone | Dec. 14, 1926 |
| 1,625,642 | Droitcour | Apr. 19, 1927 |
| 2,261,972 | Matthews | Nov. 11, 1941 |
| 2,339,268 | Hoffman | Jan. 18, 1944 |
| 2,462,439 | Thompson | Feb. 22, 1949 |
| 2,486,196 | Nebolsene | Oct. 25, 1949 |
| 2,521,075 | Matthews | Sept. 5, 1950 |
| 2,549,202 | Idelman | Apr. 17, 1951 |
| 2,617,528 | Moore | Nov. 11, 1952 |
| 2,645,480 | Long | July 14, 1953 |
| 2,680,615 | Edgar | June 8, 1954 |
| 2,772,880 | Garret | Dec. 4, 1956 |

FOREIGN PATENTS

| | | |
|---|---|---|
| 941,357 | France | Jan. 10, 1949 |